US008946968B2

(12) United States Patent
Lipot

(10) Patent No.: US 8,946,968 B2
(45) Date of Patent: Feb. 3, 2015

(54) SQUIRREL-CAGE ROTOR OF AN ASYNCHRONOUS MACHINE AND METHOD FOR PRODUCING SUCH A ROTOR

(75) Inventor: Hans-Werner Lipot, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 294 days.

(21) Appl. No.: 13/554,409

(22) Filed: Jul. 20, 2012

(65) Prior Publication Data

US 2013/0187511 A1 Jul. 25, 2013

(30) Foreign Application Priority Data

Jul. 22, 2011 (EP) ..................................... 11174997

(51) Int. Cl.
*H02K 17/00* (2006.01)
*H02K 17/16* (2006.01)
*H02K 15/00* (2006.01)

(52) U.S. Cl.
CPC .......... *H02K 17/165* (2013.01); *H02K 15/0012* (2013.01)
USPC ............................. 310/211; 310/125; 310/43

(58) Field of Classification Search
USPC .......... 310/43, 211–212, 125, 156.78, 156.81
See application file for complete search history.

(56) References Cited

U.S. PATENT DOCUMENTS

| 3,766,416 | A | * | 10/1973 | Papst et al. ..................... 310/43 |
| 3,902,087 | A | * | 8/1975 | Hakamada et al. ........... 310/211 |
| 4,885,494 | A | * | 12/1989 | Higashi ........................ 505/166 |
| 4,910,423 | A | * | 3/1990 | Werber ......................... 310/77 |
| 6,867,522 | B1 | * | 3/2005 | Vlemmings et al. ........... 310/125 |
| 2006/0267441 | A1 | * | 11/2006 | Hang et al. .................... 310/211 |
| 2008/0296993 | A1 | * | 12/2008 | Weihrauch .................... 310/211 |
| 2013/0187512 | A1 | * | 7/2013 | Buttner et al. ................ 310/211 |

FOREIGN PATENT DOCUMENTS

| DE | 195 21 700 A1 | 12/1996 |
| DE | 199 27 279 A1 | 3/2000 |
| DE | 10 2005 030 798 A1 | 1/2007 |
| JP | 61132063 A | 6/1988 |
| WO | WO 89/05054 A1 | 6/1989 |
| WO | WO 97/03490 A1 | 1/1997 |

* cited by examiner

*Primary Examiner* — Thanh Lam
(74) *Attorney, Agent, or Firm* — Henry M. Feiereisen LLC

(57) ABSTRACT

A squirrel-cage rotor of an asynchronous machine includes a laminated core having grooves and positioned in fixed rotative engagement on a shaft, and a squirrel cage including short-circuit rods which are received in the grooves and have opposite front faces, and short-circuit rings which connect the short-circuit rods on the front faces. Shrink rings respectively surround the short-circuit rings at least radially outside and rest on the shaft. A pressure-resistant hardenable plastic is provided in a gap between the short-circuit rings and the shrink rings.

5 Claims, 2 Drawing Sheets

SQUIRREL-CAGE ROTOR OF AN ASYNCHRONOUS MACHINE AND METHOD FOR PRODUCING SUCH A ROTOR

CROSS-REFERENCES TO RELATED APPLICATIONS

This application claims the priority of European Patent Application, Serial No. 11174997, filed Jul. 22, 2011, pursuant to 35 U.S.C. 119(a)-(d), the content of which is incorporated herein by reference in its entirety as if fully set forth herein.

BACKGROUND OF THE INVENTION

The present invention relates to a squirrel-cage rotor of an asynchronous machine, and to a method for producing such a squirrel-cage rotor.

The following discussion of related art is provided to assist the reader in understanding the advantages of the invention, and is not to be construed as an admission that this related art is prior art to this invention.

Squirrel-cage rotors of asynchronous machines, also referred to as cage rotors, are exposed to the risk, particularly at high rotational speeds, of their short-circuit rings, which are arranged on the axial ends of the laminated core, bending or even breaking on account of centrifugal forces. For example, U.S. Pat. No. 5,719,457 proposes to control centrifugal forces in the region of the short-circuit rings, which is axially distanced from a laminated core, by pushing shrink rings over the short-circuit rings.

DE 199 27 279 A1 proposes interference fit assemblies of a short-circuit ring which is axially distanced from the laminated core to absorb the centrifugal forces of the short-circuit ring.

DE 10 2005 030 798 A1 discloses a rotor of an asynchronous machine, having short-circuit rings available directly on the front faces of a laminated core, wherein the laminated core has grooves for receiving short-circuit rods, wherein the short-circuit rods on the respective front faces are connected by the short-circuit ring and wherein additional profiled sheets exist in the region of the short-circuit ring, which are used to pack the laminated core and to absorb the centrifugal forces of the short-circuit ring.

Common to all conventional solutions is the fact that they are relatively complicated and thus costly in terms of their realization. Shrink rings or interference fit assemblies cause mechanical stresses in the affected components, which, as experience has shown, come into play after a period of operation and thus cause geometric changes in the rotor which negatively affect the original smoothness of the squirrel-cage rotor.

It would therefore be desirable and advantageous to provide an improved squirrel-cage rotor for an asynchronous machine to obviate prior art shortcomings and to be applicable for high rotational speeds, while yet being simple in structure and effectively ensuring absorption of forces occurring particularly in the region of the short-circuit ring at high rotational speeds of the squirrel-cage rotor.

SUMMARY OF THE INVENTION

According to one aspect of the present invention, a squirrel-cage rotor of an asynchronous machine includes a laminated core having grooves and positioned in fixed rotative engagement on a shaft, a squirrel cage including short-circuit rods which are received in the grooves and have opposite front faces, and short-circuit rings which connect the short-circuit rods on the front faces, shrink rings respectively surrounding the short-circuit rings at least radially outside and resting on the shaft, and a pressure-resistant hardenable plastic provided in a gap between the short-circuit rings and the shrink rings.

According to another aspect of the present invention, a method for producing a squirrel-cage rotor of an asynchronous machine includes packaging or punch packaging a laminated core, positioning a squirrel cage in the laminated core, shrink fitting the laminated core on a shaft, axially attaching shrink rings on front faces of the squirrel cage, and injecting hardenable pressure-resistant plastic into a gap between the shrink ring and a short-circuit ring of the squirrel cage.

In order to absorb centrifugal forces of the squirrel-cage rotor at high rotational speeds, e.g. of greater than 4000 rpm, in particular of the short-circuit ring, a shrink ring is now provided on the front faces in accordance with the invention. The shrink ring is axially inserted onto the shaft and radially surrounding the short-circuit ring at least on its surface facing a stator. The centrifugal force stress of the short-circuit ring and the laminations can therefore now be considerably reduced in the region of the short-circuit ring.

On account of the necessary measuring accuracies, the gap between the shrink ring and the short-circuit ring is now provided in accordance with the invention with a hardenable pressure-resistant plastic material. After the positioning of the shrink rings onto the short-circuit rings, this plastic is introduced and hardened via an injection opening provided especially on the shrink rings or via the gap itself into the gap between the short-circuit ring and the shrink ring.

The production of the squirrel-cage rotor is therefore advantageous as follows. Both the squirrel-cage rotor and also the shrink ring do not have to be processed exactly to size in order to effectively compensate for forces occurring during operation. No mechanical stresses are therefore introduced into these components which reduce and/or come into play over the course of time and as a result negatively affect the smoothness of the squirrel-cage rotor.

The hardened plastic causes the forces to be passed on directly from the short-circuit ring to the shrink ring, as if the short-circuit ring and shrink ring were custom-built.

In accordance with the invention, the short-circuit ring therefore has to be cast less accurately to size, and also the shrink ring, particularly with the segment which surrounds the short-circuit ring, in particular has to be embodied less accurately to size. As a result, imbalances possibly occurring in the squirrel-cage rotor can be compensated for by suitable means on the front faces of the short-circuit ring and/or of the shrink ring.

Additional material, for instance in the form of balancing cams, which is added to a predeterminable radius of the short-circuit ring or of the shrink ring, is particularly suitable here.

Similarly, material can also be removed and/or taken off at the above-cited points.

The centrifugal forces are now passed on from the short-circuit ring via the hardened plastic to the enclosure of the shrink ring and absorbed there so that no radial outwards load is placed on the short-circuit ring.

The enclosing surface is ensured by a bowl-shaped inner surface of the shrink ring in the region of the short-circuit ring. The enclosing surface can however also be embodied as a supporting ring, which supports the short-circuit ring only on one side, in particular the radially exterior side, which faces a stator. The decisive factor here is that at least the gap between the short-circuit ring and the radial enclosing surface is provided with hardenable plastic.

According to another advantageous feature of the present invention, both the short-circuit ring and also the plastic and in particular the shrink ring can have the same thermal expansion coefficients. Unnecessary material stresses within the arrangement are thus prevented.

The production method of a squirrel-cage rotor is simplified in accordance with the invention in that the previously simply die-cast squirrel-cage rotor is now provided with a shrink ring on the two front faces, which does not have to be processed and/or pressed and/or shrunk precisely to the size and in a custom-fit manner.

The inevitable gap arising between the inner surface of the shrink ring and the surface of the short-circuit ring is now filled in accordance with the invention with a hardenable pressure-resistant plastic.

The retaining forces of the shrink ring retroact directly on the short-circuit ring, which during operation of the asynchronous machine, attempts to extend radially on account of the developing centrifugal forces.

The plastic can enter the gap between the inner surface of the shrink ring and the surface of the short-circuit ring here in different ways.

The plastic is put into the gap by way of an assembly apparatus, which prevents plastic from escaping at the edges of the shrink ring. The gap can therefore also be filled with plastic at a predeterminable pressure, which prevents cavities in the gap. The centrifugal force compensation is thus ensured in any event.

A further variant is to provide the plastic with a predeterminable layer thickness prior to assembly of the shrink ring onto the short-circuit ring, e.g. on the inner surface of the shrink ring. By placing and positioning the shrink ring on the short-circuit ring, the extra plastic oozes out of the gap and is removed prior to hardening of the plastic.

The plastic is hardened for instance by means of a temperature effect. In this way either the whole squirrel-cage rotor or only the short-circuit ring provided with the shrink rings and the plastic are exposed to a heat treatment which can be varied in terms of time and temperature.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
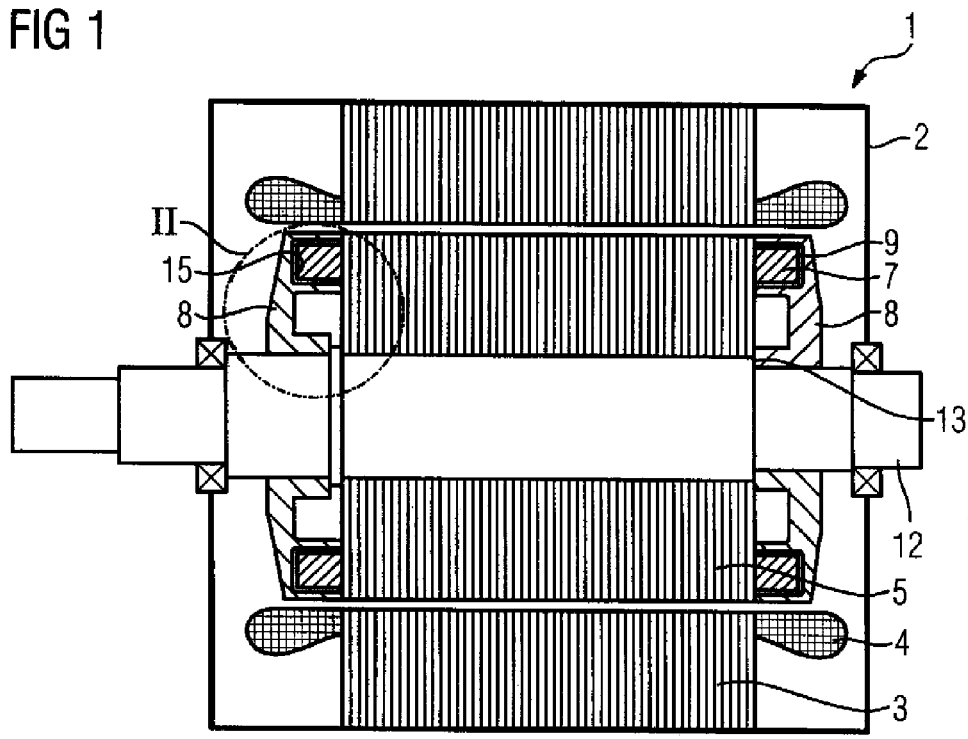
FIG. 1 shows a longitudinal section of an asynchronous machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic longitudinal section of an asynchronous machine 1 in a housing 2, which has a stator laminated core 3, into which a winding (not shown in more detail) is placed, which embodies coil ends 4 on the front faces of the stator laminated core 3. The stator laminated core 3 surrounds a stator hole. A rotor 5, which is embodied as a squirrel-cage rotor is located radially inside the stator hole. The rotor 5 is constructed from laminated sheets, which are connected to a shaft 12 in a rotatably fixed manner. The shaft 12 is mounted in the housing 2.

Short-circuit rods 6, which are electrically conductively connected to a short-circuit ring 7 directly on the front face of the rotor, are located in grooves (not shown in more detail) of the laminated core of the rotor 5 formed from laminations. In particular, short-circuit rods 6 and short-circuit ring 7 form a single part produced in the die casting method, a squirrel cage.

The invention is however also suited to squirrel-cage rotors, in which short-circuit rods 6 and short-circuit rings 7 are welded or soldered to one another.

Similarly, the invention is also suited to a rotor 5, in which the short-circuit rings 7 are at a distance from the front faces of the laminated core of the rotor 5.

A shrink ring 8 encompassing the short-circuit ring 7 is located on the front faces of the rotor 5 in each instance. In this embodiment according to FIG. 1, the short-circuit ring 7 is in this case surrounded on three sides by the shrink ring and delimited on one side by the laminated core of the rotor 5.

A gap 9, which is filled with a pressure-resistant hardenable plastic is located between the shrink ring 8 and the short-circuit ring 7. This takes place for instance by way of special openings of the shrink ring 8, which are not shown in further detail. The shrink ring 8 is positioned by a stop 14 of the shaft 12 on the left side, whereas the ring is positioned by a shaft projection 13 on the right side of the rotor 5.

The position of the shrink rings 8 and also the laminated core of the rotor 5 is defined by its position with respect to the shaft 12. Measuring accuracy of these parts is thus only needed in respect of the shaft 12. Measuring accuracy of the inner surface of the shrink ring 8 relative to the short-circuit ring 7 is only needed to a limited extent. The gap 9 therefore has various widths, which are however filled by the pressure-resistant hardenable plastic and are thus non-critical.

Figure 2:
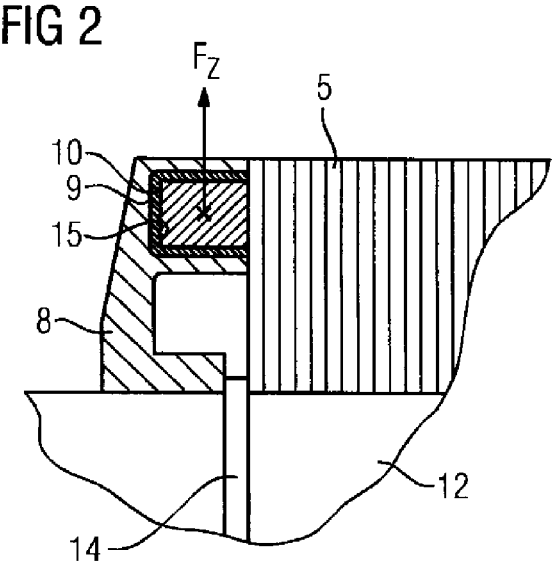
FIG. 2 shows a detailed view of a short-circuit ring.

According to FIG. 2 the centrifugal forces $F_Z$ of the short-circuit ring 7 are thus absorbed during operation of the asynchronous machine.

The laminated core of the rotor 5 is moved here for production purposes from the right side onto the shaft 12 and is connected thereto in a non-rotatable manner. This is done for instance by means of a shrink-on process. In this case the laminated core of the rotor 5 is heated and expands. The shaft 12 can now be added. The subsequent cooling produces a rotatably fixed connection between the laminated core and the shaft 12.

Alternatively, the shaft 12 can also be cooled right down and thus pushed into the laminated core.

A peripheral stop 14 is used here as a stop for the laminated core. After positioning the laminated core with its pressure-cast squirrel cage, the shrink rings 8 are attached to the front faces of the rotor 5 and are likewise connected as described above to the shaft 12 in a rotatably fixed manner for instance. The gaps 9 are then filled by the plastic.

The plastic is provided for instance by way of an assembly apparatus, which prevents the plastic from escaping into the gap 9 at the edges of the shrink ring 8. The gap 9 can therefore also be filled with plastic at a predeterminable pressure, thereby preventing cavities in the gap 9. After hardening the plastic, the centrifugal force compensation is ensured as with a precise size compliance of the short-circuit ring 7 and the peripheral surface of the shrink ring 8.

A further option of introducing plastic into the gap is to apply the plastic to the inner surface of the shrink ring 8 with a predeterminable layer thickness prior to assembly of the shrink ring 8 on the short-circuit ring 7. By placing and positioning the shrink ring 8 on the short-circuit ring 7, the extra plastic oozes out of the gap 9 and is removed prior to hardening of the plastic.

The plastic is hardened for instance by applying heat to it in an oven or by means of irradiation. Here either the entire squirrel-cage rotor or only the short-circuit ring 8 provided with the shrink rings 8 and the plastic are exposed to a heat treatment, which can be varied in terms of time and temperature.

Figure 3:
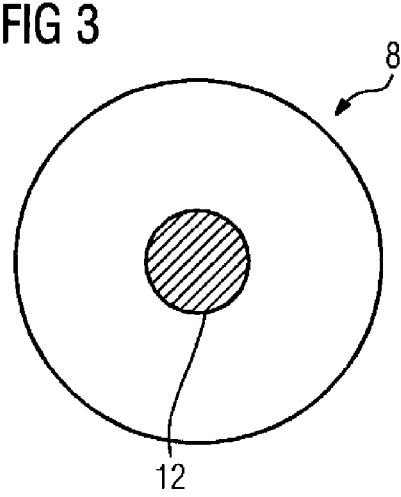
FIGS. 3 to 6 show embodiments of the shrink ring.
Figure 4:
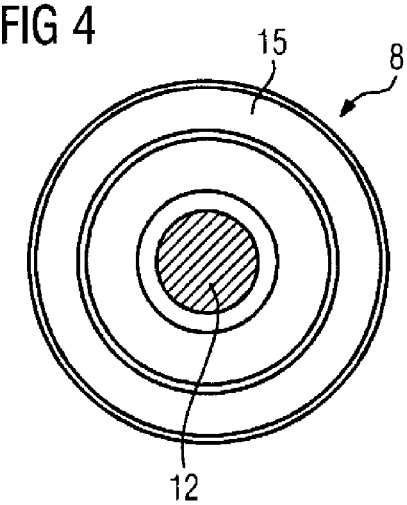

FIGS. 3, 4 shows an embodiment of the shrink ring 8, which is in principle also shown in FIGS. 1 and 2. A bowl-type inner surface 15 of the shrink ring 8 surrounds the short-circuit ring 7 on three sides.

Figure 5:
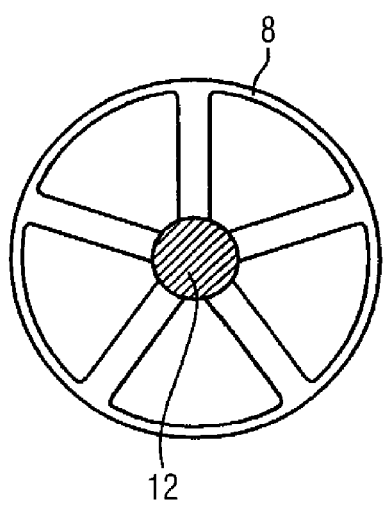
Figure 6:
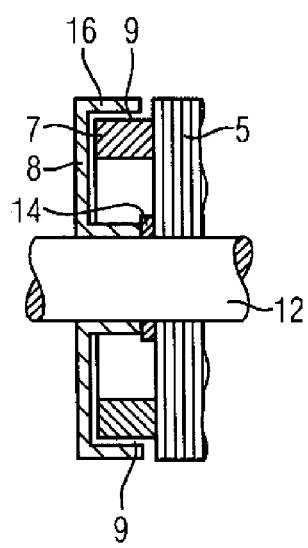

In another embodiment of the shrink ring 8 according to FIG. 5, 6, a supporting ring 16 surrounds at least part of the radially outer side of the short-circuit ring 7. The supporting ring 16 is held here by a spoke-type apparatus, which is positioned on the shaft 12. The gap 9 to be filled with plastic therefore only arises between an outer part of the short-circuit ring 7 and the supporting ring 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A squirrel-cage rotor of an asynchronous machine, comprising:
    a laminated core having grooves and positioned in fixed rotative engagement on a shaft;
    a squirrel cage including short-circuit rods which are received in the grooves and have opposite front faces, and short-circuit rings which connect the short-circuit rods on the front faces;
    shrink rings respectively surrounding the short-circuit rings at least radially outside and resting on the shaft; and
    a pressure-resistant hardenable plastic provided in a gap between the short-circuit rings and the shrink rings.

2. The squirrel-cage rotor of claim 1, constructed in the form of a die cast rotor.

3. The squirrel-cage rotor of claim 1, wherein the shrink rings have each a section to surround the short-circuit rings in a bowl-type fashion.

4. The squirrel-cage rotor of claim 1, wherein the shrink rings have each a supporting ring to surround the short-circuit rings at least on part of a radial outer surface of the short-circuit rings.

5. The squirrel-cage rotor of claim 1, wherein the shrink rings and the short-circuit rings essentially have a same thermal expansion coefficient.

* * * * *